(12) United States Patent
Bench et al.

(10) Patent No.: US 12,313,217 B2
(45) Date of Patent: *May 27, 2025

(54) QUICK ATTACH AND DETACH MOUNT FOR FIREARMS AND OTHER OBJECTS

(71) Applicant: Sellmark Corporation, Mansfield, TX (US)

(72) Inventors: Cody Bench, Grand Prairie, TX (US); Andrew Pischke, Mansfield, TX (US); Seth D. Fritz, Italy, TX (US)

(73) Assignee: Sellmark Corporation, Mansfield, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/588,787

(22) Filed: Feb. 27, 2024

(65) Prior Publication Data
US 2024/0318771 A1 Sep. 26, 2024

Related U.S. Application Data

(63) Continuation-in-part of application No. 18/115,320, filed on Feb. 28, 2023, now Pat. No. 12,169,110.

(51) Int. Cl.
| | | |
|---|---|---|
| *F16M 11/00* | (2006.01) | |
| *F16M 11/04* | (2006.01) | |
| *F16M 13/02* | (2006.01) | |

(52) U.S. Cl.
CPC .......... *F16M 13/02* (2013.01); *F16M 11/041* (2013.01)

(58) Field of Classification Search
CPC ....... F16M 13/02; F16M 11/041; F41A 23/04; F41A 23/08; F41A 23/12
See application file for complete search history.

(56) References Cited

U.S. PATENT DOCUMENTS

| | | |
|---|---|---|
| 6,637,904 B2 | 10/2003 | Hernandez |
| 7,409,153 B2 | 8/2008 | Ramadan |
| 7,571,563 B2 | 8/2009 | Peterson |

(Continued)

FOREIGN PATENT DOCUMENTS

JP 2006518156 A 8/2006

OTHER PUBLICATIONS beltfeds.com et al., "M60 Machine Gun Mount—A Closer Look," May 4, 2015, https://www.youtube.com/watch?v=T-j9p3SQ1cE (accessed Jul. 10, 2024).

(Continued)

*Primary Examiner* — Amy J. Sterling
(74) *Attorney, Agent, or Firm* — Mark D. Perdue

(57) ABSTRACT

An apparatus for coupling an object to a support has an object member that includes an upper surface configured for attachment to a portion of the object, a lower extent including a generally conical object portion depending from the object member; and a notch formed in a portion of the lower extent. A support member includes a lower surface configured for attachment to the support, an upper surface, and a receptacle formed in the upper surface to receive the lower extent of the object member. The receptacle includes a generally conical support portion to receive and mate with the generally conical object portion. A latch member is selectively operable to engage the notch of the object portion to selectively secure together the object and support members.

12 Claims, 10 Drawing Sheets

(56) References Cited

U.S. PATENT DOCUMENTS

| | | |
|---|---|---|
| 7,798,049 B2 | 9/2010 | Willis, Jr. |
| 8,104,213 B2 | 1/2012 | Keng et al. |
| 8,464,628 B2 | 6/2013 | Potterfield et al. |
| 8,857,097 B2 | 10/2014 | Rorick |
| 8,894,024 B2 | 11/2014 | Deros |
| 9,568,281 B1 | 2/2017 | Chen |
| 10,619,977 B2 * | 4/2020 | Silvennoinen ........ F41G 11/003 |
| 11,585,620 B2 * | 2/2023 | Raley ...................... F41A 19/43 |
| 12,135,109 B2 * | 11/2024 | Speggiorin .......... F16M 11/041 |
| 2007/0079541 A1 | 4/2007 | Peterson |
| 2010/0307046 A1 | 12/2010 | Cheng |
| 2012/0210624 A1 | 8/2012 | Schneider et al. |
| 2013/0312307 A1 | 11/2013 | Rorick |
| 2017/0153084 A1 | 6/2017 | Tarazi |
| 2019/0120423 A1 | 4/2019 | Couch, III |
| 2019/0137208 A1 | 5/2019 | Messinger |
| 2022/0325974 A1 | 10/2022 | Azhocar |
| 2023/0243614 A1 | 8/2023 | Landis et al. |

OTHER PUBLICATIONS

European Patent Office, Extended European Search Report, Jul. 29, 2024.
STS, "Mk 97 M240 Machine Gun Mount," Mar. 2, 2020, https://www.youtube.com/watch?v=HgJWBKA5JV0 (accessed Jul. 10, 2024).

* cited by examiner

QUICK ATTACH AND DETACH MOUNT FOR FIREARMS AND OTHER OBJECTS

BACKGROUND OF THE INVENTION

1. Field of the Invention

The invention relates to mounts and similar coupling devices and apparatus for attaching firearms and other objects to supports such as tripods. More particularly, the present invention relates to such apparatus having quick-attach and quick-detach features.

2. Summary of the Prior Art

In some cases, it is desirable to mount a firearm or other object on a support structure. The support structure may comprise a tripod, bipod, monopod, or other arrangement that supports the weight of the object in whole or in part while often including the ability to change the orientation of the object. In addition to firearms, the objects mounted on support structures may include telescopes, spotting scopes, binoculars, cameras, rangefinders and similar instruments, as well as other objects.

The assembled object and support structure tend to be large and unwieldy, particularly for transportation or storage. Accordingly, the support structures often are designed to be "collapsible," with telescoping or folding legs and the like, or to be quickly and easily disassembled and reassembled.

However, the object itself is typically coupled or secured to the support structure using threaded fasteners that are strong and capable of rigidly coupling the object to the support, but tend not to be adapted for quick assembly and disassembly. These couplings or mounts may also be inconvenient in the event it is desirable to change the object, for example from an optical device to a firearm. Use of tools or manipulation of thumbwheels and other mechanisms can be particularly unwieldy when a large and heavy object, such as a firearm, is supported by the support structure. Particularly for hunting and similar "field" pursuits, the ability to disassemble the object from the support quickly and to disassemble or collapse the support itself, and to quickly reassemble and deploy them, may be highly desirable features.

U.S. Pat. No. 7,571,563, Aug. 11, 2009, discloses a mounting for a firearm on a support structure in the form of a bipod or monopod in which a grooved "male" part associated with the firearm is received in a "female" part containing ball detents and associated with the support structure. The disclosed coupling, and the remainder of the disclosed device are not rigid.

A need exists, therefore, for mounts or couplings for releasably securing a firearm or other object securely and rigidly to a support structure while also permitting the rapid disassembly of the object from the support structure.

SUMMARY OF THE INVENTION

It is a general object of the present invention to provide an improved mount for attaching and detaching an object, such as a firearm or optical device, to a support or support structure such as a tripod, bipod, monopod or the like.

This and other objects of the present invention are achieved by providing an apparatus comprising an object member that includes an upper surface configured for attachment to a portion of the object, a lower extent including a tapered, at least partially conical object portion depending from the object member; and a notch formed in a portion of the lower extent. A support member includes a lower surface configured for attachment to the support, an upper surface, and a receptacle formed in the upper surface to receive the lower extent of the object member. The receptacle includes a tapered, at least partially conical support portion to receive and mate with the tapered, at least partially conical object portion. A latch member is selectively operable to engage the notch of the object portion to selectively secure together the object and support members.

According to one embodiment of the invention, the tapered, at least partially conical object portion further comprises a plurality of surfaces converging toward an object apex, the apex extending toward a forward end of the object member, and the tapered, at least partially conical support portion of the receptacle further comprises at least one surface converging toward a support apex, wherein, upon assembling together the object and support members, the converging surfaces of the generally conical object and support portions of the object and support members mate together.

According to yet another embodiment of the present invention, the object is a firearm, and the support is a tripod.

Other objects, features, and advantages of the invention will become apparent to those skilled in the art from the Figures and the Detailed Description of the Invention, which follows.

DETAILED DESCRIPTION OF THE INVENTION

Figure 1:
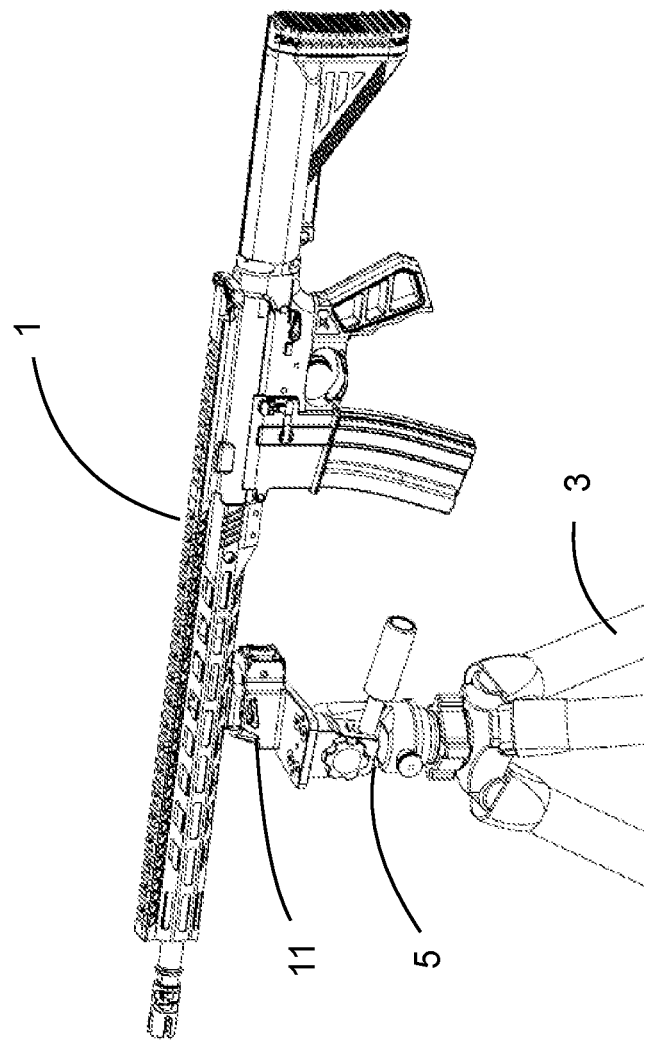
FIG. 1 is a partial perspective view of an object mounted on a support structure, including a mount according to the present invention.

Turning now to the Figures, and particularly to FIG. 1, an object or firearm 1 in the form of a rifle is depicted mounted or secured to a support structure 3 in the form of a tripod. Tripod is illustrated with an optional "tilt and pan" assembly 5, which permits orientation of firearm 1 relative to tripod 3 and to the user of the devices. A mount 11 in accordance with the teachings of the present invention may be disposed between firearm 1 and the tilt and pan portion 5 of tripod 3. The illustration of a firearm and tripod, as object and support, respectively, are exemplary only. The present invention has equal utility in mounting other, non-firearm objects, such as optical devices, to other types of support structures, such as monopods, bipods and the like that are capable of at least partially supporting and orienting an object such as a firearm or optical or other device.

Figure 2:
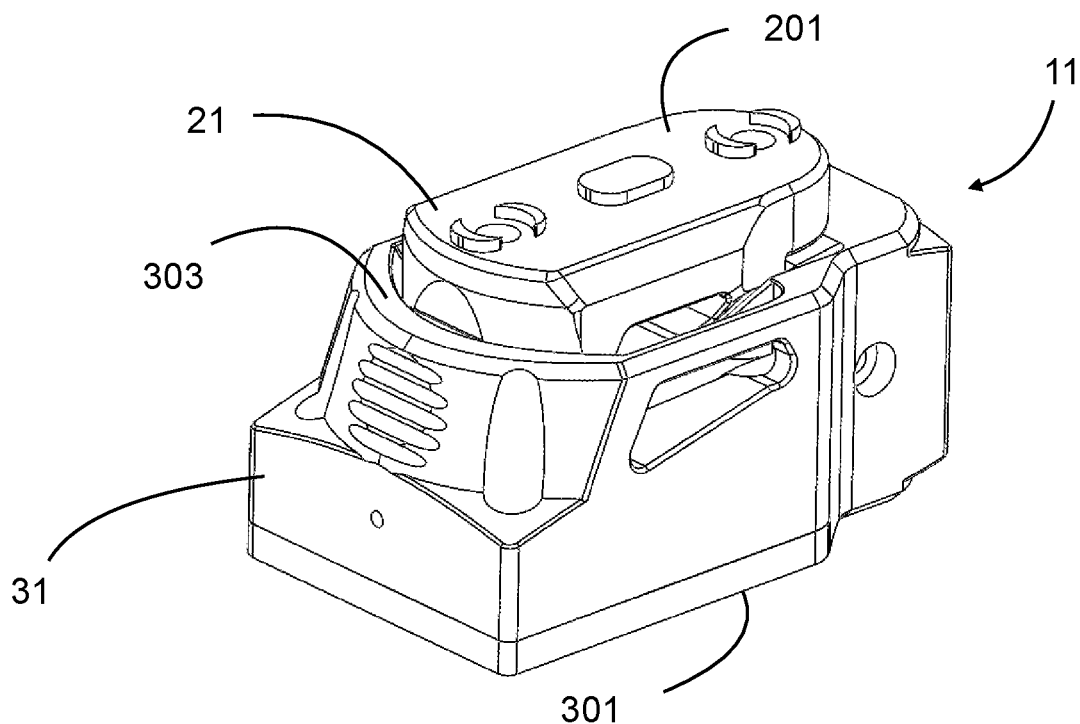
FIG. 2 is a perspective view of the mount according to the present invention assembled together.

FIG. 2 illustrates mount 11 according to one embodiment of the present invention. Mount 11 may have two basic components, an object member 21 and a support member 31, that may be assembled together as shown and as described in greater detail below. Object member 21 may have an upper surface 201 configured or adapted to be attached or secured to firearm 1 or other object by screws or other fasteners, or MIL-STD-1913 or STANAG 2324 "Picatinny" rails, or other conventional arrangements. Support member 31 may have a mounting plate that defines a lower surface 301 configured or adapted to be attached or secured to a support structure (the tilt-and-pan assembly 5 of tripod 3 in FIG. 1) by screws or other fasteners or other conventional arrangements (see FIGS. 6 and 7). As described in greater detail below, object member 21 and support member 31, attached to their respective object and support structure, may be coupled together quickly and positively, thereby securely and rigidly coupling and securing the object to the support structure (firearm 1 to tripod 3 in the example of FIG. 1).

Figure 3:
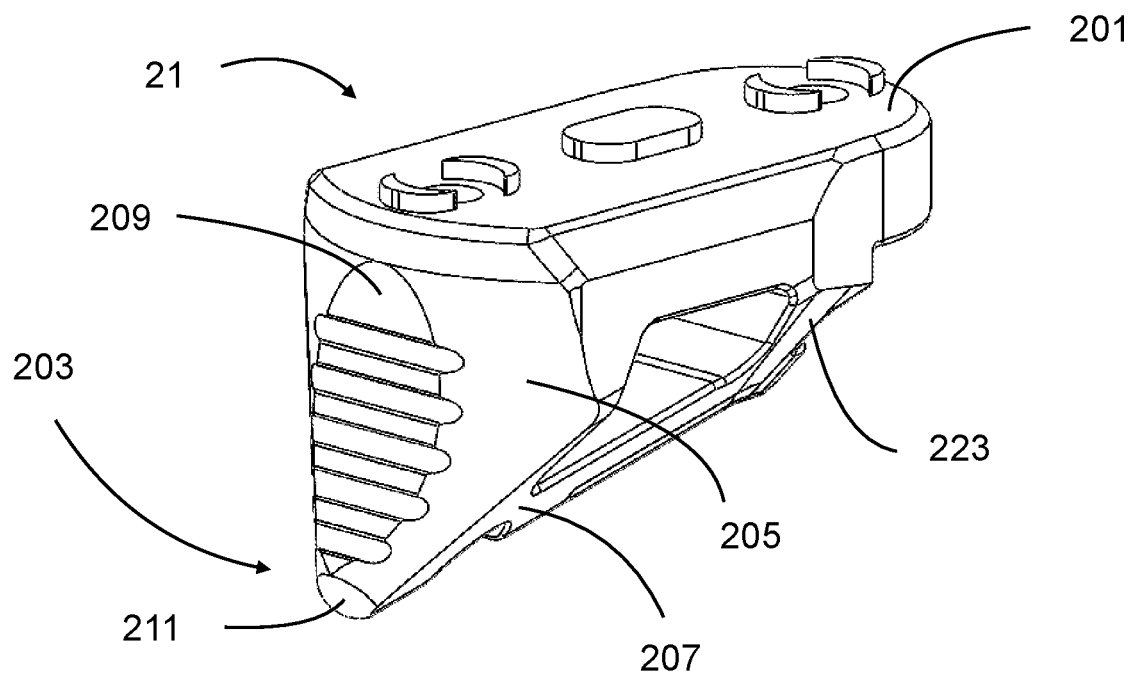
FIGS. 3 and 4 are front perspective and right-side elevation views, respectively, of the object member of the mount of FIGS. 1 and 2.
Figure 4:
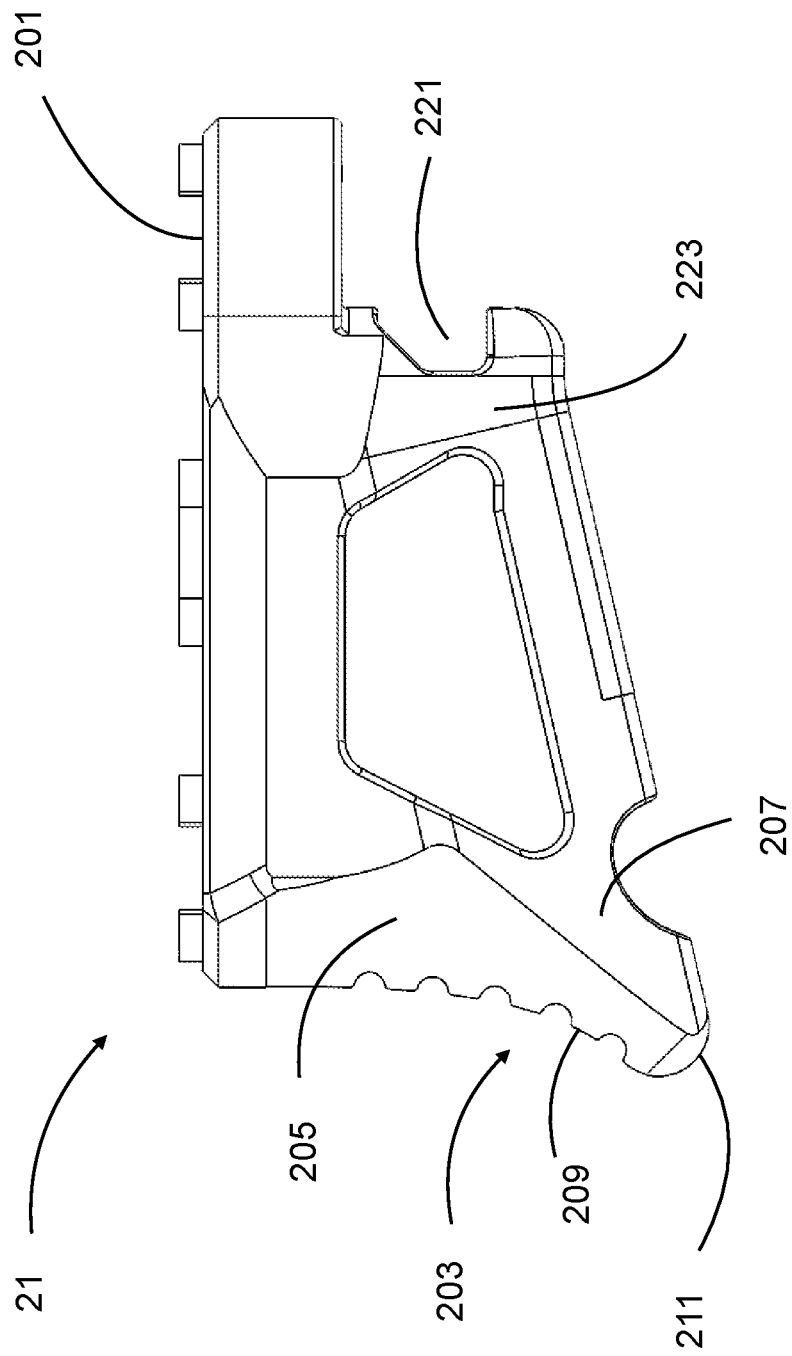

FIGS. 3 and 4 depict object member 21 separated from support member 31. A generally conical portion 203 may depend or extend downward at an angle of about 20 degrees from horizontal and toward the front of object member 21. In the illustrative embodiment, generally conical portion 203 is not conical in the sense of having a circular cross-section or base, but may comprise a plurality of surfaces, including a curved (circular) forward surfaces 205 and flat or planar lower surfaces 207 (object member 21 is symmetrical in the sense that similar or identical surfaces are present on the reverse that is obscured from view), and a curved front surface 209 formed in conical forward surface 205, that all converge to an object apex 211 oriented slightly downwardly and toward the front of object member 21. Thus, although not a right-circular cone, this plurality of surfaces forms a "generally conical" structure in which at least one surface converges or tapers toward an apex. The structure may also be a right-circular conical shape or partially conical within the definition of "generally conical."

Figure 5:
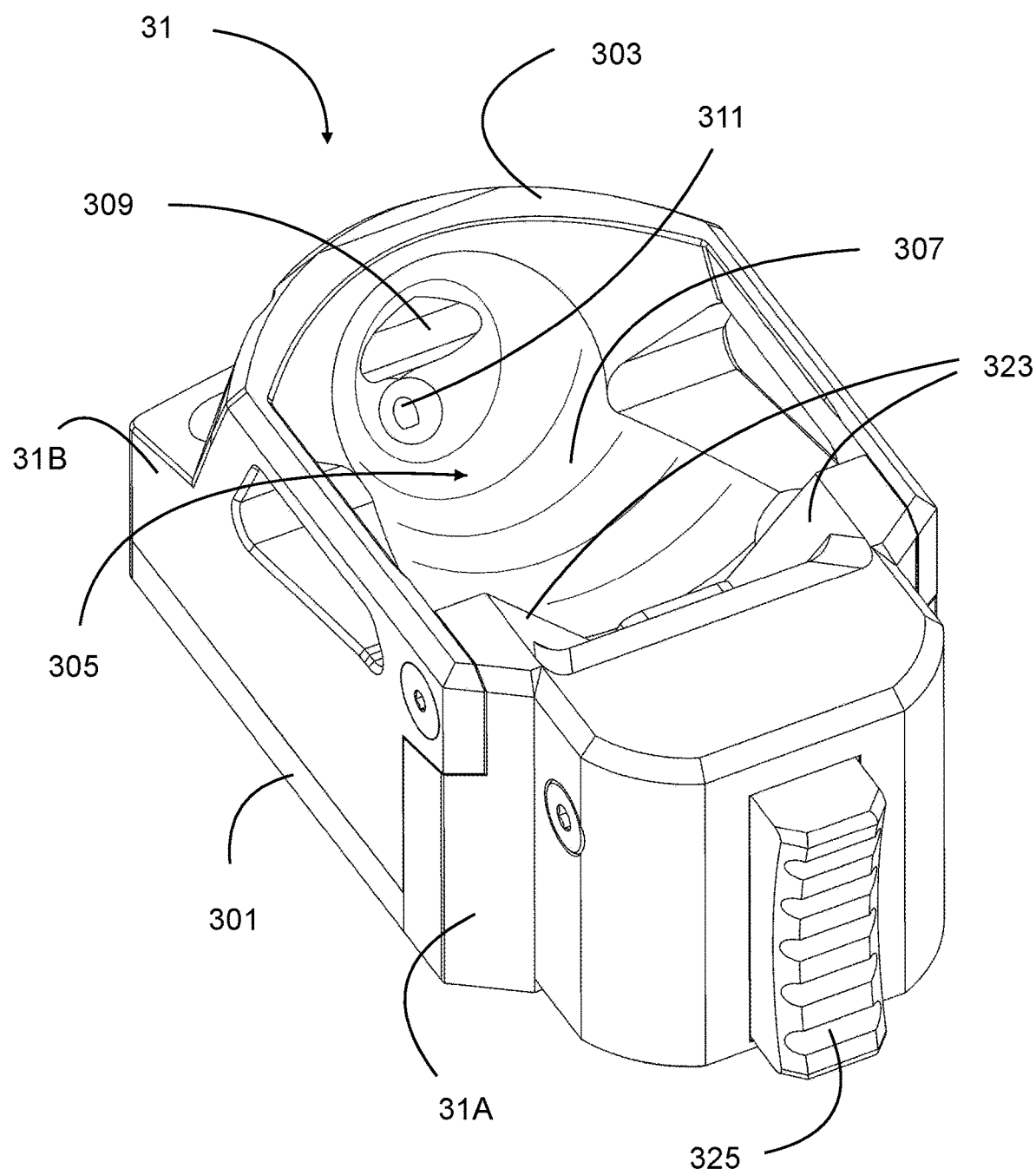
FIGS. 5 and 6 are rear perspective and longitudinal section views, respectively, of the support member of the mount of FIGS. 1 and 2.
Figure 6:
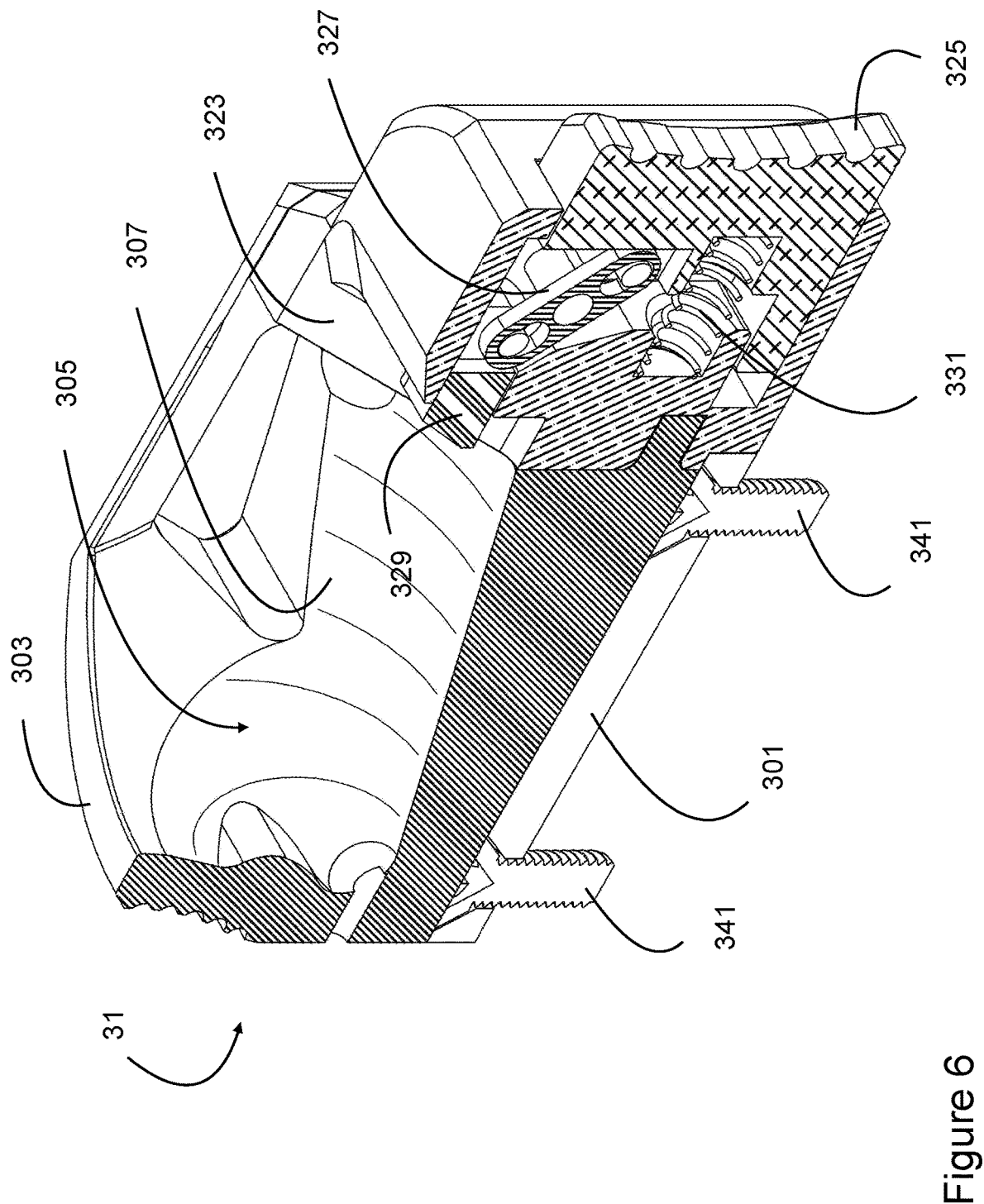

Toward the rear of the lower extent of object member 21, a pair of converging flat surfaces 223 may define a v-shape (again, the rear, mating portion of support member 21 is similar or identical, see FIGS. 5 and 6). A notch 221 (FIG. 4) may be provided in the rear of the lower extent of object member 21. Use of the terms "forward," "front," and "rear" is arbitrary for the purposes of describing locations in the drawings and the direction and orientation of such locations may be reversed or otherwise altered while remaining within the scope of the invention.

FIGS. 5 and 6 illustrate support member 31 in greater detail. As illustrated, support member 31 may be formed of two parts 31A and 31B, secured together by screws or other appropriate fasteners. At the lower extent of support member 31, an adapter plate 301 may form a portion of its lower surface and may be secured to portion 31B by screw or other fasteners. Below upper surface 303, a generally conical receptacle or cavity 305 may be formed. Unlike generally conical portion 203 of object member 21, conical receptacle 305 is truly conical (although only a partial cone), having a single circular surface 305 that tapers or converges toward a support apex 31. Like conical portion 203, receptacle need only be "generally conical" and may instead comprise a plurality of flat or curved surfaces converging or tapering toward an apex. A bulge or projection 309 may be provided in a forward portion of receptacle 305 to mate with front curved surface 209 of generally conical portion 203 of object member 21, as illustrated and described below in connection with FIG. 7.

Toward the rear of receptacle 305, a pair of generally flat surfaces 323 converge to define a v-shaped recess that mates with the v-shape of surfaces 223 of object member 21 upon assembly together. A latch button 325 may be provided at the rear of support member 31. As shown in FIG. 6, button 325 acts on pivoting lever 327, which in turn acts on latch member 329 to retract and extend latch member 329 into engagement notch 221 in the rear of object member 21. Biasing member or coil spring 331 may be employed to bias latch member 329 forward into a forward, latched position and to maintain latch button biased rearwardly until actuated. Latch member 329 thus "automatically" (without user actuation) engages with notch 221 upon mating together of object 21 and support 31 members. A pair of screws or other fasteners 341 may extend through adapter plate 301 into engagement with threaded apertures in support 3 (tilt and pan assembly 5 in FIG. 1).

Figure 7:
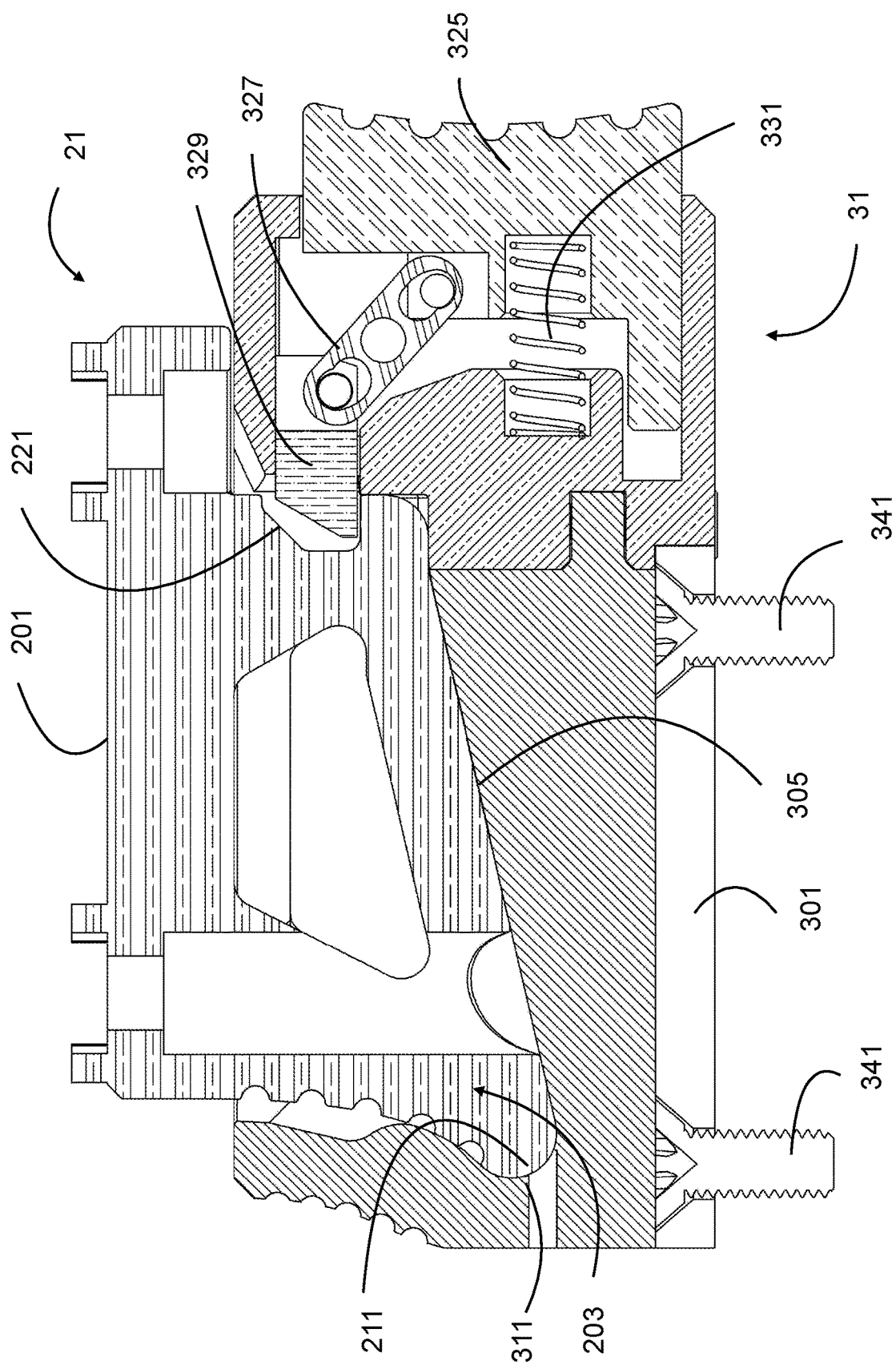
FIG. 7 is a longitudinal section view of the mount of FIGS. 1 and 2 showing the object and support members assembled together.
Figure 8:
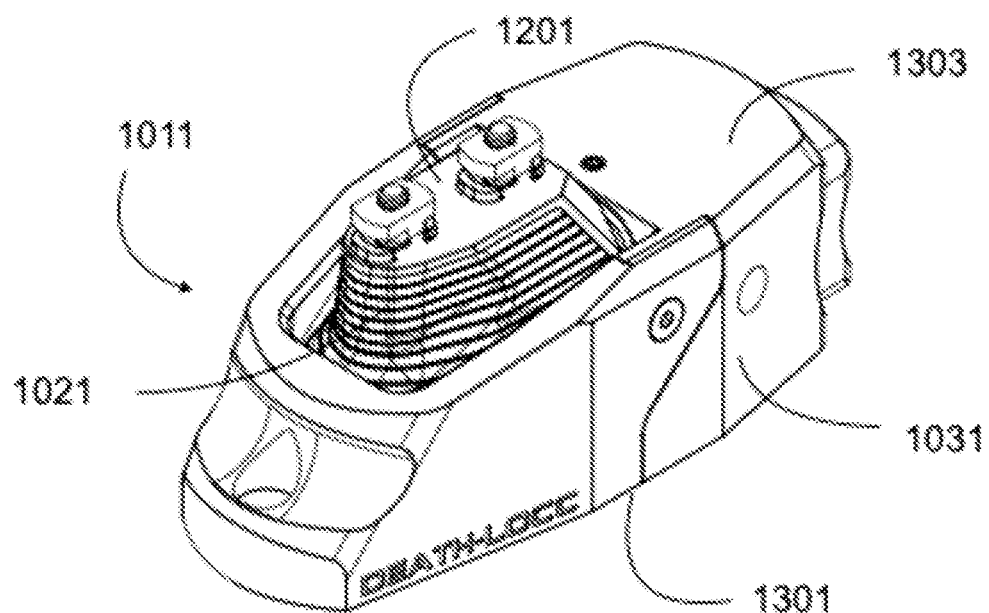
FIG. 8 is a perspective view of the mount according to another embodiment of the present invention assembled together.
Figure 9:
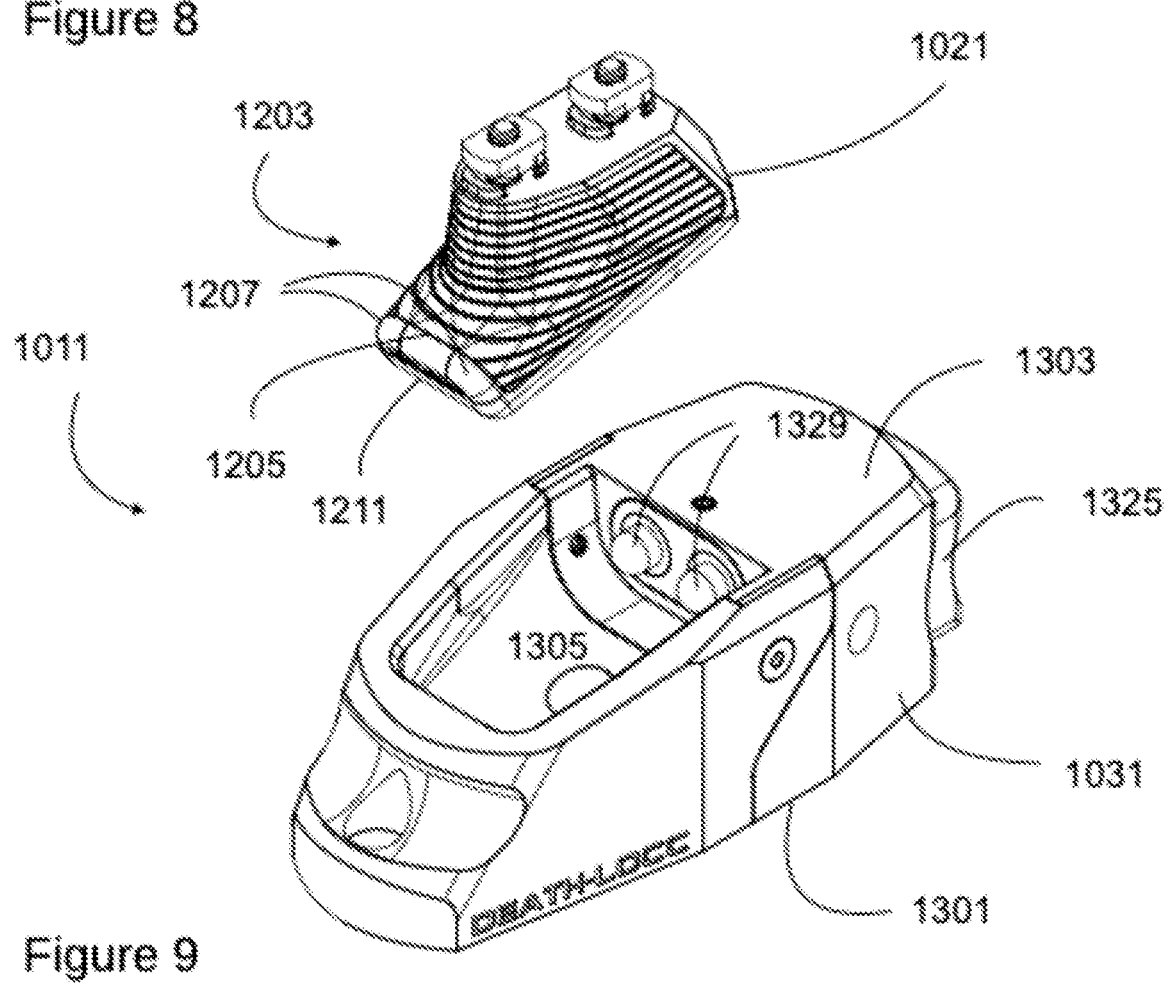
FIGS. 9 and 10 are front and rear exploded perspective views, respectively, of the mount of FIG. 8.
Figure 10:
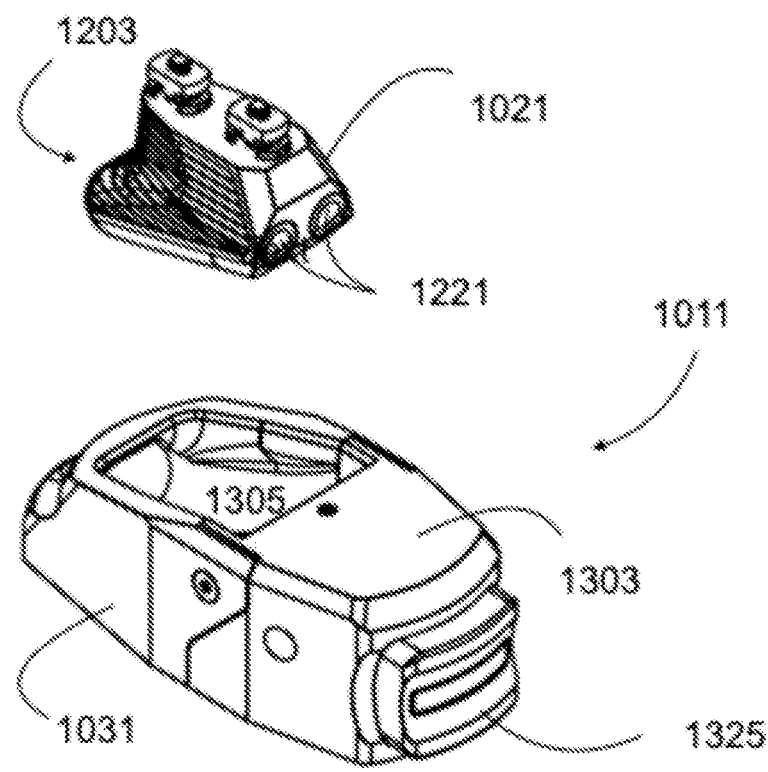

FIG. 7 depicts, in section view, object and support members 21, 31 assembled together. Generally conical portion 203 of object member 21 may be received in generally conical receptacle 305 of support member 31. The generally conical shapes may align and register object and support members 21, 31 together, and v-shaped surfaces 223 and 323 also mate and register when object and support apexes 211, 311 are registered or mated together at the maximum forward and downward travel of conical portion 203 within conical receptacle 305. Thus, conical portion 203 of object member 21 and conical receptacle 305 of support member 31 may be considered "complementary" in that they fit together and retain together in use object and support members, 21, 31 and their respective attachments.

Latch member 329 may "automatically" engage with notch 221 to retain members 21, 31 together and to urge conical portion 203 downwardly into engagement with conical receptacle 305. Bulge 309 in receptacle 305 mates with front curved surface 209 to aid retention of conical portion 203 in receptacle 303. Curved surface 209 and bulge 309 assist in the retention together of object and support members 21, 31 in use.

FIGS. 8 through 14 depict another embodiment of a mount 1011 according to the present invention. Mount 1011 may comprise two pieces, an object member 1021 and a support member 1031 that may be assembled together. Upper or object member 1021 includes an upper surface 1221 that is configured to mount to an object, such as a firearm, optic or other object, while lower or support member 1031 includes a lower surface 1301 that is configured to mount to a support, such as a tripod, bipod, monopod, or other support, as depicted in FIG. 1.

At a lower extent 1203 of object member 1021, a plurality of surfaces, including flat upper surface 1205 and a pair of curved edge or side surfaces 1207 depend downwardly at an angle of about 20 degrees from horizontal and toward the front of object member 1021 and converge or taper to an object member apex 1211. Like the generally conical lower extent 203 of the embodiment of FIGS. 2 through 7, this portion 1203 of object member 1021 is generally or partially conical, having a superelliptical base comprising a plurality of surfaces 1205, 1207 that taper toward apex 1211. The conical section does not extend all the way to the rear of object member 1021, thus it is referred to as "partial" or "partially conical." A pair of horizontally aligned and spaced latch apertures 1221 (FIG. 10) may be formed in a rear portion of object member 1021.

An upper surface 1303 of support member 1031 may include a receptacle or cavity 1305 that receives lower extent 1203 of object member 1021 and is correspondingly at least partially conical in shape to match and mate with the surfaces of the lower extent 1203 of object member 1021. A latch button 1325 may be provided at the rear of support member 1031. As with the embodiment of FIGS. 2 through 7, at least partially conical portion 1203 of object member 1021 and conical receptacle 1305 of support member 1031 may be considered "complementary" in that they fit together and retain together in use object and support members 1021, 1031 and their respective attachments.

Figure 11:
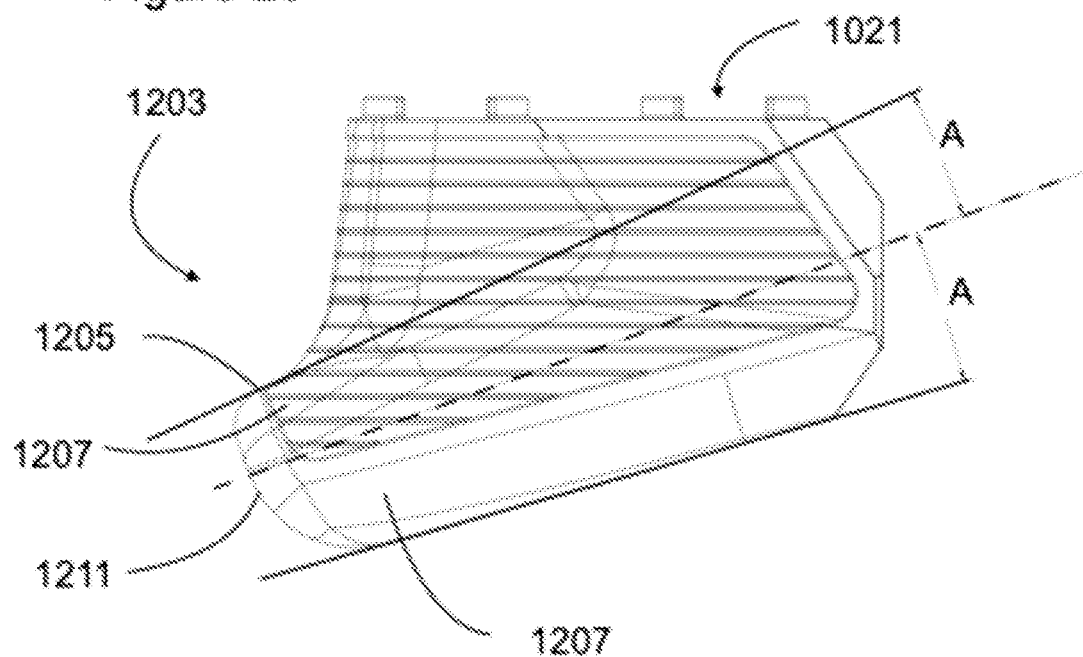
FIG. 11 is a side elevation view of the object member portion of the mount of FIG. 8.
Figure 12:
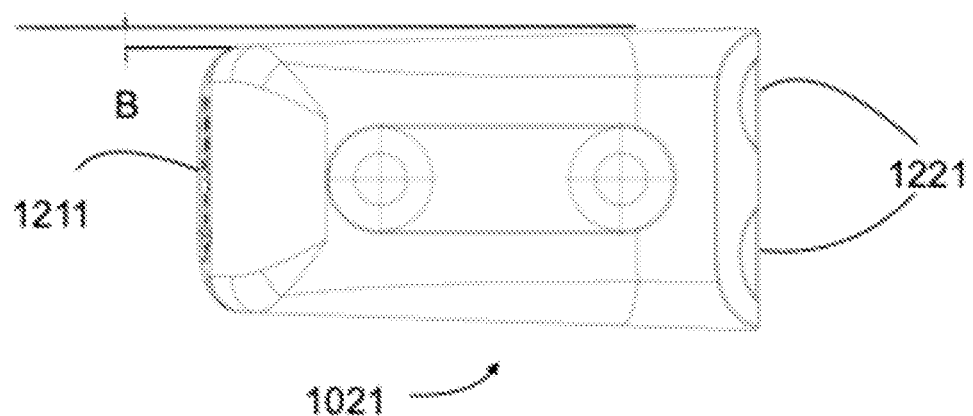
FIG. 12 is a bottom plan view of the object member portion of the mount of FIG. 8.
Figure 13:
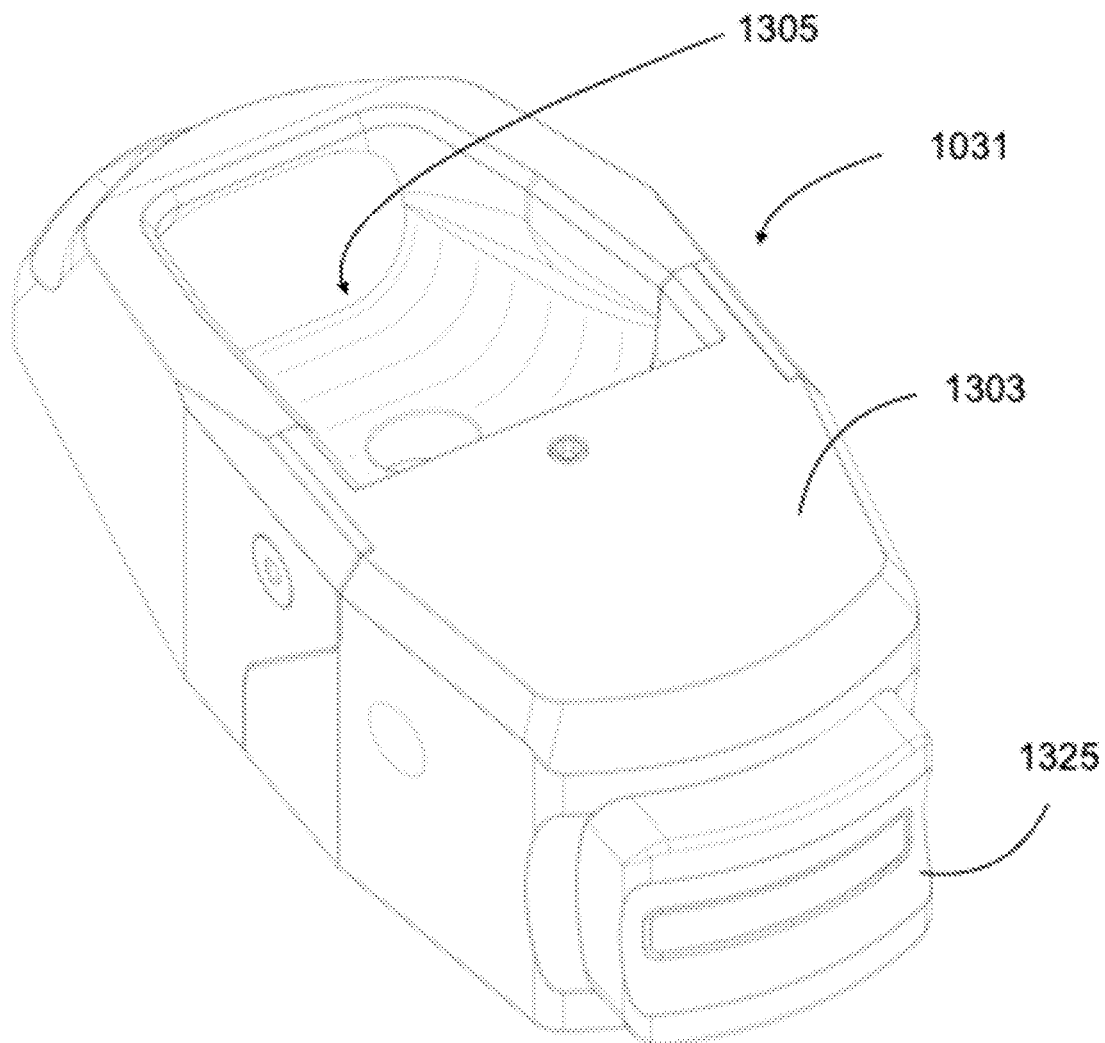
FIG. 13 is a rear perspective view of the support member portion of the mount of FIG. 8.
Figure 14:
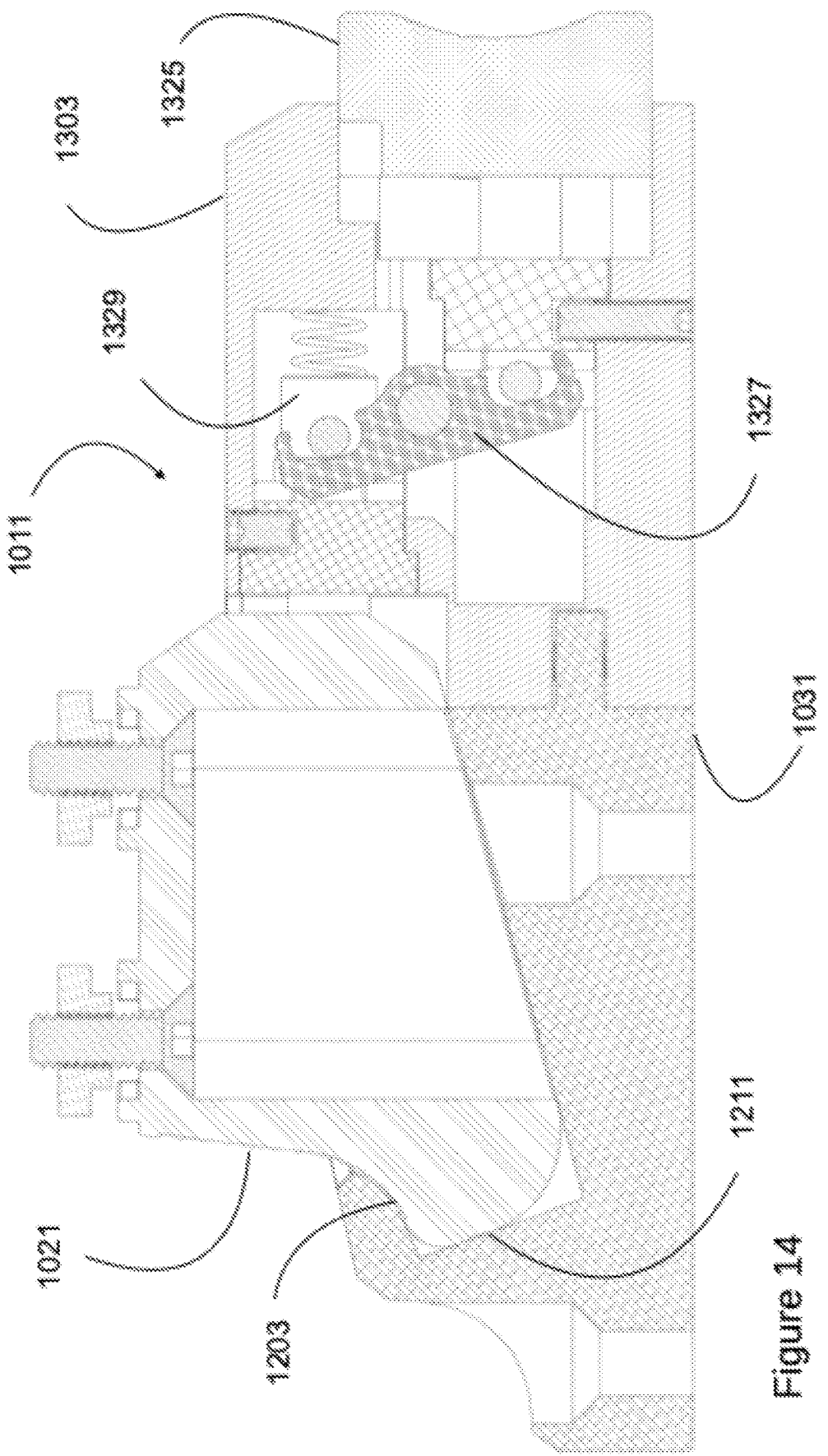
FIG. 14 is a longitudinal section view of the mount of FIG. 8, with the object and support portions assembled together.

FIGS. 11 and 12 illustrate the taper angles of lower extent 1203 of object member 1021. The upper and lower surfaces taper or converge inwardly toward apex 1211 at a preferred angle A of about 4.48 degrees, relative to a central axis of lower extent 1203. Similarly, the sides of lower extent 1203 of object member 1021 taper inwardly at an angle B of about 2.08 degrees, toward apex 1211, and relative to the central axis of object member 1021. FIG. 14 is a section view of object and support members, 1021, 1031, mated together and latched. Apex 1211 of object member 1021 is received and captured in a forward portion of receptacle 1305, while the remainder of lower extent 1203 is in close mating relation with the correspondingly shaped receptacle 1305, "locking" object member 1021 and support member 1031 together.

Pins 1329 are spring-biased into engagement with apertures 1221 in the rear of object member 1021. Actuation of latch button 1325 acts through lever 1327 to retract pins 1329 from engagement with apertures 1221, thus permitting object 1021 and support members 1031 to be separated by lifting and disengaging object member 1021 relative to support member 1031.

Object 21, 1021 and support 31, 1031 members may preferably be cast and/or machined from anodized 6061 aluminum. Lever 327, 1327 and latch member 329 or pins 1329 may preferably be formed from cast, machined, or forged steel or stainless steel, for additional strength and wear-resistance. Other materials, including polymers, reinforced polymers, and metals may be suitable, as well.

In operation, object member 21, 1021 may be secured to an object such as a rifle 1. Support member 31 may be secured to a support structure such as a tripod 3, 5. When It is desired to mount rifle 1 on tripod 3, 5, generally or partially conical portion of lower extent 203, 1203 may be inserted into receptacle 305, 1305 and pushed down and forward until latch member 329 or pins 1329 engages notch 221 or apertures 1221, at which time object and support members 21, 1021, 31, 1032 are securely and rigidly coupled together along with rifle 1 and tripod 3, 5. To disassemble, latch button 325, 1325 may be depressed to retract latch member 329 or pins 1329 from engagement with notch 221 or apertures 1221 and object and support members 21, 1021, 31, 1031 may be disengaged or disassembled by moving rifle 1 and object member 21 upwardly and rearwardly relative to tripod 3, 5 and support member 31, 1031.

The mount according to the teachings of the present invention and preferred and exemplary embodiments presents a number of advantages. Primarily, it provides a very easily and quickly attachable and detachable connection between an object and support structure, particularly when the object is heavy and awkwardly shaped. It provides a connection that is rigid, self-aligning and self-centering, and requires no tools and actuation of only a single, easily accessed button to disassemble. The relatively large generally conical portion and receptacle are easily aligned and mated, even when the object is large and heavy or otherwise unwieldy.

The invention has been described with reference to preferred and exemplary embodiments. It is thus susceptible to variation and modification without departing from the scope of the claims, which follow.

The invention claimed is:

1. An apparatus for coupling an object to a support, the apparatus comprising:
    an object member including:
        an upper surface configured for attachment to a portion of the object; and
        a lower extent including a tapered, at least partially conical object portion depending from the object member;
    a support member including:
        a lower surface configured for attachment to the support;
        an upper surface;
        a receptacle formed in the upper surface to receive the lower extent of the object member, the receptacle including a tapered, at least partially conical support portion to receive and mate with the tapered, at least partially conical object portion; and
    a latch selectively operable to secure together the object and support members.

2. The apparatus according to claim 1, wherein:
    the tapered, at least partially conical object portion further comprises a plurality of surfaces converging toward an object apex, the apex extending toward a forward end of the object member; and
    the tapered, at least partially conical support portion of the receptacle further comprises at least one surface converging toward a support apex, wherein, upon assembling together the object and support members, the converging surfaces of the tapered, at least partially conical object and support portions of the object and support members mate together.

3. The apparatus according to claim 2, wherein the latch further comprises:
    a pair of horizontally aligned and spaced-apart latch apertures formed on a rear of the object member; and
    a pair of pins carried by the support member and arranged to engage the latch apertures responsive to actuation of a latch button disposed at a rear of the support member.

4. The apparatus according to claim 1, wherein the object is a firearm, and the support is a tripod.

5. An apparatus for coupling an object to a support, the apparatus comprising:
    an object member including:
        an upper surface configured for attachment to a portion of the object;
        a lower extent including a tapered, at least partially conical object portion depending from the object member; and
        at least one latch aperture formed in a portion of the lower extent;
    a support member including:

a lower surface configured for attachment to the support;

an upper surface;

a receptacle formed in the upper surface to receive the lower extent of the object member, the receptacle including a tapered, at least partially conical support portion to receive and mate with the tapered, at least partially conical object portion; and a latch member selectively operable to engage the latch aperture of the object portion to selectively secure together the object and support members.

6. The apparatus according to claim 5, wherein the latch aperture further comprises a pair of horizontally aligned and spaced-apart latch apertures.

7. The apparatus according to claim 6, wherein the latch member further comprises:

a pair of pins carried by the support member, each of the pins arranged to engage one of the pair of latch apertures; and a latch button disposed at a rear of the support member and operable to selectively move the pair of pins in and out of engagement with the latch apertures.

8. The apparatus according to claim 5, wherein the object is a firearm, and the support is a tripod.

9. An apparatus for coupling a firearm or optic to a support, the apparatus comprising:

an object member including:

an upper surface configured for attachment to a portion of the firearm or optic;

a lower extent including a plurality of surfaces tapering to an apex depending downwardly from the object member; and at least one latch aperture formed in a portion of the lower extent;

a support member including:

a lower surface configured for attachment to the support;

an upper surface;

a receptacle formed in the upper surface to receive the lower extent of the object member, the receptacle including a plurality of surfaces tapering to a support apex to receive and mate with the plurality of surfaces tapering to an object apex of the object member; and a latch member selectively operable to engage the latch aperture of the object portion to selectively secure together the object and support members.

10. The apparatus according to claim 9, wherein the latch aperture further comprises a pair of horizontally aligned and spaced-apart latch apertures.

11. The apparatus according to claim 9, wherein the latch member further comprises:

a pair of pins carried by the support member, each of the pins arranged to engage one of the pair of latch apertures; and a latch button disposed at a rear of the support member and operable to selectively move the pair of pins in and out of engagement with the latch apertures.

12. The apparatus according to claim 9, wherein the support is one of a monopod, a bipod, and a tripod.

* * * * *